United States Patent Office 3,836,441
Patented Sept. 17, 1974

3,836,441
ELECTROCHEMICAL OXIDATION PROCESS
James Peter Millington, Chester, England, assignor to The Electricity Council, London, England
Filed Jan. 11, 1972, Ser. No. 216,987
Claims priority, application Great Britain, Jan. 12, 1971, 1,502/71
Int. Cl. B01k 1/00; C07b 3/00
U.S. Cl. 204—78
8 Claims

ABSTRACT OF THE DISCLOSURE

A process for the electrochemical oxidation of an oxidizable organic compound to an oxidized form comprises, (a) subjecting the oxidizable organic compound dissolved or suspended in an electrolyte to electrolysis in an electrolytic cell by
(b) passing the electrolyte containing the oxidizable organic compound through a lead dioxide mesh electrode, as the anode, disposed in the electrolytic cell,
(c) said lead dioxide mesh electrode comprising a substrate of titanium mesh having a coating of lead dioxide electrodeposited thereon.

Figure 1:
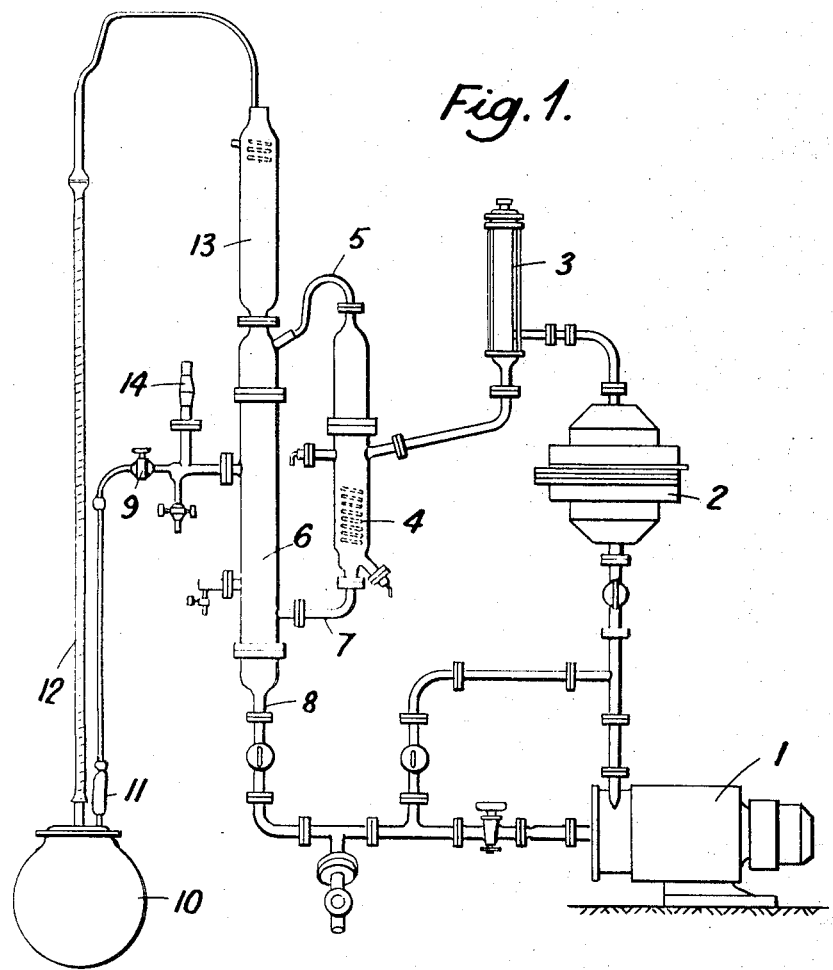

An apparatus for the electrochemical oxidation of an oxidizable organic compound is also described.

BACKGROUND OF THE INVENTION

1 Field of the Invention

This invention relates to electrochemical oxidation processes and in particular to a process for the electrochemical oxidation of oxidizable organic compounds and to apparatus therefor.

The electrochemical processes previously described for the oxidation of organic compounds have generally been inefficient in that the amount of oxidized product obtained for the expenditure of a given quantity of electricity represents only a small percentage of the conversion theoretically attainable. An electrochemical reaction of particular interest is the oxidation of benzene to p-benzoquinone, the reaction being expressed by the following equation:

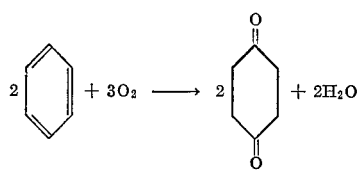

From the above equation it can be deduced that 1 Faraday is equivalent to 18 g. of p-benzoquinone and that 18 g. of p-benzoquinone would therefore theoretically be produced by a charge of 26.8 amp./hr.

2 Description of the Prior Art

The most efficient process previously reported for the electrochemical oxidation of benzene to p-benzoquinone is that described in British Patent Specification No. 430,572 which quotes a figure of 45 g. of product per kw. hr. of power. In the process described in Specification No. 430,572, benzene is passed through or stirred with an electrolyte preferably consisting of dilute sulphuric acid or of a mixture of sulphuric acid and a soluble sulphate such as sodium sulphate, and subjected to electrolysis in an electrolyte cell in which an active and stable anode of lead or an alloy of lead and an inactive cathode are disposed, preferably close to each other, the concentration of quinone in the cell being kept low by its continuous or frequent removal.

It has now been found that improved power yields for electrochemical oxidation processes may be achieved by employing as anode in the process at least one lead dioxide mesh electrode comprising a substrate of titanium mesh having a coating of lead dioxide electrodeposited thereon and by passing the compound to be oxidized, which is suspended or dissolved in an electrolyte, through the lead dioxide mesh electrode. For example, using a single lead dioxide mesh electrode for the oxidation of benzene to p-benzoquinone it has been found possible, at least on a laboratory scale, to obtain a yield of 120 g. per kw. hr. at a current density of 50 ma./cm.$^2$ or 200 g. per kw. hr. at 5 ma./cm.$^2$; using a stack of five lead dioxide electrodes as anode it has been found possible to obtain power yields of 120 g. per kw. hr. at an effective current density of 250 ma./cm.$^2$ or 200 g. per kw. hr. at an effective current density of 25 ma./cm.$^2$.

SUMMARY OF THE INVENTION

According to the present invention there is provided a process for the electrochemical oxidation of an oxidizable organic compound to an oxidized form which process comprises (a) subjecting the oxidizable organic compound dissolved or suspended in an electrolyte, for example, dilute sulphuric acid, to electrolysis in an electrolytic cell by
(b) passing the electrolyte containing the oxidizable organic compound through a lead dioxide mesh electrode, as the anode, disposed in the electrolytic cell,
(c) said lead dioxide mesh electrode comprising a substrate of titanium mesh having a coating of lead dioxide electrodeposited thereon.

DESCRIPTION OF THE PREFERRED EMBODIMENTS

The efficiency of the process of the invention depends on maintaining a high concentration of oxidizable organic compound (the organic depolariser) in the region of the anode surface and this is achieved by using a high surface area mesh electrode as anode and by passing a suspension or solution of the oxidizable organic compound in an electrolyte through the mesh itself. Ultimately however the process is dependent upon the oxidizable organic compound being sufficiently soluble, or being made to dissolve sufficiently by the addition of a mutual solvent, in the base electrolyte. Particularly desirable results have been obtained with the following combinations of oxidizable organic compound, mutual solvent and base electrolyte:

| Oxidizable organic compound | Mutual solvent | Base electrolyte |
|---|---|---|
| Benzene | | Dilute sulphuric acid. |
| Naphthalene | Acetone | Do. |
| Toluene | do | Do. |

In the case of the electrochemical oxidation of for example benzene to p-benzoquinone, the suspension of benzene in the electrolyte which is passed through the mesh electrode serves to remove the product, p-benzoquinone from the region of the electrode thus preventing further oxidation of the product, this effect principally being due to the solubility of p-benzoquinone in benzene. Similar effects may be observed for other oxidizable organic compounds and the products therefrom and these effects probably not only reduce further oxidation of the product but increase the efficiency of the process itself by allowing further quantities of unreacted oxidizable compound to approach the anode.

The lead dioxide mesh electrodes comprising a substrate of titanium mesh having a coating of lead dioxide electrodeposited thereon are preferably produced by the process described and claimed in the complete specification of British Patent Application No. 1,502/71 which process comprises:

(1) removal of any surface grease from the titanium mesh substrate by treatment thereof with a degreasing solvent, for example, genclean or trichloroethylene, (2) electrochemical removal of the titanium oxide film from the titanium mesh substrate by cathodisation, preferably carried out in an electrolyte of sulphuric acid, and thereafter, (3) electrodepositing lead dioxide onto the titanium substrate, which is made the anode, from an electrolyte solution containing one or more lead salts, such that the anode current density is increased during the electrodeposition.

Preferably in stage (3) of the above process for producing the electrode, the electrodeposition of lead dioxide onto the titanium substrate is carried out in two successive periods, the anode current density in the second period being higher than the anode current density employed during the first period. For instance the initial period, which may be for example from 30 mins. to 2 hours duration, may be carried out at a current density of from 20 to 50 ma./cm.$^2$ and the second period which may be for example from 30 mins. to 3 or more hours duration, may be carried out at a current density of from 50 to 100 ma./cm.$^2$.

The effective surface area of the anode used in the process of the present invention may be increased by employing as the anode a plurality of lead dioxide mesh electrodes in layers or as a stack. Thus in a preferred embodiment the anode comprises a plurality of lead dioxide mesh electrodes, particularly preferred being a plurality of lead dioxide mesh electrodes as described and claimed in the complete specification of British Patent Application No. 1,502/71.

In accordance with the invention, electrolyte/oxidizable organic compound solution or suspension is passed through the lead dioxide mesh electrode or electrodes, for example, by means of a pump. Electrolyte solution or suspension which has already passed through the anode may be continuously or intermittently withdrawn from the electrolytic cell to an external reservoir wherein oxidized product may be separated, for example, by solvent extraction, from the electrolyte/unreacted oxidizable organic compound solution or suspension which may subsequently be recirculated to the electrolytic cell to be re-contacted with the anode or anodes. Preferably, means are also provided for extracting oxidized product from the external reservoir.

The cathode employed in the process of the present invention may be of conventional construction such as a solid lead cathode but is preferably a titanium mesh, not coated with lead dioxide.

It is to be understood that the invention also includes oxidized organic compounds whenever produced by the process of the invention as hereinbefore described.

In yet another aspect the invention provides an apparatus for the electrochemical oxidation of an oxidizable organic compound which apparatus comprises an electrolytic cell provided with an inlet means and an outlet means and having disposed therein at least one cathode and at least one lead dioxide mesh electrode, as anode, comprising a substrate of titanium mesh having a coating of lead dioxide electrodeposited thereon such that electrolyte entering the cell through said inlet means and leaving the cell through said outlet means passes through the lead dioxide mesh electrode.

Again, it is preferred that the lead dioxide mesh electrode employed in the apparatus of the invention should be produced by the process described and claimed in the complete specification of British Patent Application No. 1,502/71 as hereinbefore referred to in greater detail. A preferred feature of the electrode described in Application No. 1502/71 and which is particularly desirable in the apparatus of the present invention is that the edges of the titanium mesh substrate should be sealed into a plastic rim. This can be done by fitting the substrate into a mould and using a polyester resin or by any form of pressure sealing technique or by injection moulding. In order to provide electrical contact however it is desirable to allow an unexpanded strip of titanium to protrude beyond the plastic rim, where necessary.

The electrolytic cell may have disposed therein a plurality of lead dioxide mesh electrodes as anodes, which may be arranged in layers or as a stack. Similarly, one or more cathodes such as solid lead cathodes but preferably uncoated titanium mesh cathodes may be disposed in the electrolytic cell. The electrodes for example, may be arranged with one cathode above one, two or three anodes or with anodes and cathodes placed alternately, the anodes and cathodes both being wired in parallel in all cases.

The apparatus of the invention may additionally comprise such further features as are required for operating the process such as a means, for example, a pump, for recirculating electrolyte/oxidizable organic compound solution or suspension through the electrolyte cell and an external reservoir connected to the cell and to the recirculating means into which reservoir, electrolyte solution or suspension containing oxidized product may be withdrawn. Preferably a means is also provided for extracting oxidized product from the external reservoir.

Figure 2:
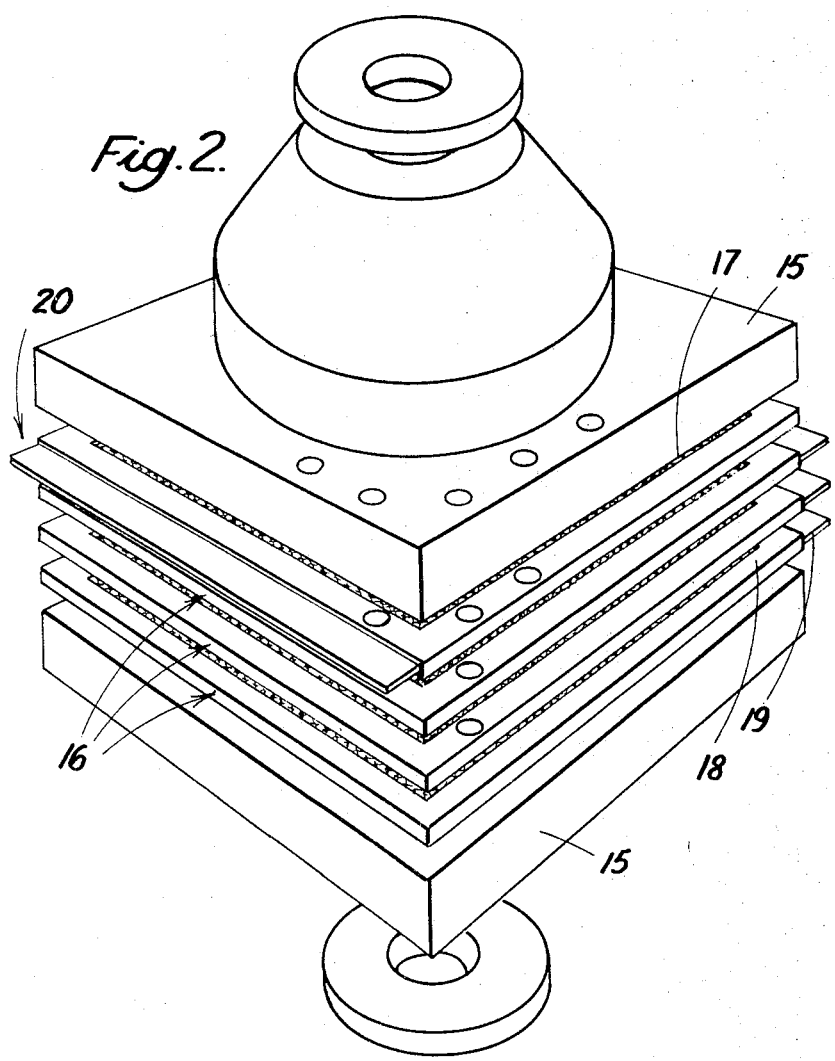

The electrochemical oxidation process and apparatus therefor will now be more particularly described and illustrated, by way of example, with reference to the accompanying drawings wherein, FIG. 1 is a diagrammatic representation of an apparatus suitable for the electrochemical oxidation of an oxidizable organic compound in accordance with the invention, and FIG. 2 is an exploded diagram of the electrolytic cell incorporated in the apparatus shown in FIG. 1.

For the purpose of illustration the following specific description will refer where appropriate to the electrochemical oxidation of benzene to p-benzoquinone using an electrolyte of dilute sulphuric acid.

Referring to FIG. 1, an intimate mixture of benzene and aqueous sulphuric acid (10%) is circulated round the apparatus by means of an all glass pump 1. The internal diameter of all the connecting glass pipe work is 2.5 centimetres and that of the vessels labelled 4 and 6 10.0 centimetres. The flow in the system should be between 50 and 100 litres per minute which gives a linear flow in the cell 2, past the electrodes of between 1 and 2 centimetres per second.

To describe the functions in sequence, the mixture of benzene and sulphuric acid is passed from the pump into the cell 2 where some of the benzene is oxidized to p-benzoquinone which dissolves in the unreacted benzene. This and the hydrogen produced by the cathodic reaction are carried through the filter 3 to the vessel labelled 4. This is a heat exchanger which is used to maintain the electrolyte at a constant temperature between 30 and 60 degrees centigrade. It also serves as a separator for the hydrogen. In this case the hydrogen is fed into the condenser via pipe 5 and then vented to air, but it could be collected and stored.

The mixture of electrolyte and p-benzoquinone in benzene solution then flows into the vessel labelled 6, where a partial separation of the less dense benzene layer occurs. The lower half of the vessel contains a mixture of a benzene solution of p-benzoquinone and electrolyte which enters by pipe 7 and leaves by pipe 8 and the upper part of the vessel contains a solution of p-benzoquinone in benzene. The concentration of p-benzoquinone in this layer increases as more product is carried into the vessel from the cell 2. When the concentration of p-benzoquinone reaches a value of between 15 and 30 grammes per litre the tap 9 is opened and the solution is allowed to run into the distillation flask 10 through the drying unit 11. This latter device contains granules of silica gel and calcium carbonate which remove any traces of water and acid. The flask is heated by means of a steam bath and the benzene is vaporized and the vapour passed through the lagged pipe 12 and is condensed and returned to the electrochemical part of the stystem by means of the condenser 13. As the p-benzoquinone is involatile under these conditions it remains in the flask and can be removed from time to time by filtration of the contents of the flask.

On a larger scale a low pressure evaporator could be used for this part of the process.

The equipment is initially filled through the pipe 14 and further additions of benzene are also made through this pipe.

Referring to FIG. 2, the electrolytic cell consists of two end caps 15 which can be made from any non-conducting material which is resistant to benzene and sulphuric acid. The lower cap may incorporate a porous ceramic plate to give a uniform flow pattern through the cell. The external cross sectional dimensions of the cell are 35 x 35 centimetres and the end caps are each 15 centimetres tall. The anode 16 consists of a mesh, made by expanding a piece of titanium 17, coated with a film of lead dioxide. The mesh is surrounded by a rim of polyester resin 18 2.5 centimetres wide and 1.0 centimetres thick, an unexpanded strip of titanium being allowed to protrude beyond the polyester rim 19, and when the cell is assembled, outside the cell, to serve as the electrical contact. The polyester rim has several holes along each edge to accommodate the threaded rods which are used to hold the cell assembly together. The coating of the titanium mesh with lead dioxide was carried out in accordance with the process described and claimed in the complete specification of British Patent Application No. 1,502/71. The cathode 20 is identical to the anode but is not coated with lead dioxide. The gaskets between the electrodes and between the electrodes and the end caps are made from insertion rubber, but can be made from any suitable gasket material which is non conducting and is resistant to sulphuric acid and benzene. The distance between the electrodes i.e. between adjacent anodes and/or cathodes is 1.0 centimetres.

The internal dimensions of the cell are 30 centirmetres x 30 centimetres making the geometric area of each electrode 900 square centimetres. The cell may be assembled with one cathode above one, two or three anodes or with anode and cathode placed alternately, with the anodes and cathodes both wired in parallel in all cases.

The process of the invention using the apparatus as hereinbefore specifically described with reference to the drawings will now be further illustrated in the following Examples 1 to 8 which demonstrate the improved efficiencies obtainable by the present process.

Example 1

The cell was arranged with one anode and one cathode and the equipment was charged with 7 litres of benzene and 6 litres of sulphuric acid (10%). The pump was started and a current of 9 amperes was passed between the anode and cathode, the potential between the two electrodes being 4 volts.

When the concentration of p-benzoquinone in the separating vessel 6 had reached a level between 15 and 30 grammes per litre the tap 9 was opened and the solution allowed to run into the distillation flask 10, at the same rate as the benzene was allowed to distil back into the electrochemical circuit via the pipe 12 and condenser 13. These rates were adjusted so that the concentration of p-benzoquinone in the benzene layer remained between 15 and 30 grammes per litre.

Under these conditions the cell produces 4.7 grammes of p-benzoquinone per hour at a current yield of 131 grammes per kilowatt hour.

Example 2

The conditions were identical to those described in Example 1 with the exception that a current of 18 amperes was used.

The equipment yielded 8.7 grammes per hour of p-benzoquinone at 120 grammes per kilowatt hour.

Example 3

The conditions were identical to those described in Example 1 with the exception that a current of 27 amperes was used.

The equipment yielded 7.4 grammes per hour of p-benzoquinone of 69 grammes per killowatt hour.

Example 4

The cell was arranged with two anodes and one cathode and the equipment was charged with 14 litres of benzene and 12 litres of sulphuric acid (10%) the pump was started and a current of 72 amperes passed between the two anodes and one cathode, the potential being about 4.0 volts.

The concentration of p-benzoquinone in the benzene layer in the separation vessel was maintained at a constant level as described in Example 1.

Under these conditions the cell produces 26.5 grammes of p-benzoquinone per hour at a current efficiency of 92 grammes per kilowatt hour.

Example 5

The cell was assembled with three anodes wired in parallel and one cathode. The equipment was charged with 12 litres of benzene and 12 litres of sulphuric acid (10%) and a current of 54 amperes applied, the potential was in the region of 4 volts. The equipment was operated as described in Example 1.

A yield of 16 grammes of p-benzoquinone per hour was obtained at 74 grammes per kilowatt hour.

Example 6

The electrodes were arranged in two pairs anode, cathode, anode, cathode, the two anodes being in parallel and the two cathodes also being in parallel. The cell was charged with 12 litres of benzene and 12 litres of sulphuric acid (10%) and was operated as described in Example 1 but a current of 18 amperes was used, the potential was 4.0 volts.

The equipment produced 9.0 grammes of p-benzoquinone per hour at a power yield of 130 grammes per kilowatt hour.

Example 7

The cell was arranged with one anode and one cathode and the equipment was charged with 12 litres of sulphuric acid (10%) containing 10% acetone and 100 g. of naphthalene.

The equipment was operated at a current of 9 amperes and the potential between the two electrodes was 5 volts. After 10 hours the pump was stopped and the power to the cell turned off and the electrolyte extracted with several one litre portions of diethyl ether.

Analysis of this ether extract showed that under these conditions the cell produces 43 grammes of naphthaquinone per kilowatt hour.

Example 8

The cell was arranged with one anode and one cathode and the equipment charged with 12 litres of sulphuric acid (10%) containing 10% acetone and 100 g. of toluene.

The equipment was operated at a current of 9 amperes and the potential between the two electrodes was 5 volts. After 10 hours the equipment was switched off and the precipitated benzoic acid was collected by filtration. Under these conditions the cell produces 50 grammes of benzoic acid per kilowatt hour.

I claim:
1. A process for the electrochemical oxidation of an oxidizable organic compound to an oxidized form which process comprises,
(a) subjecting the oxidizable organic compound dissolved or suspended in an electrolyte to electrolysis in an electrolytic cell by
(b) passing the electrolyte containing the oxidizable organic compound through a lead dioxide mesh electrode, as the anode, disposed in the electrolytic cell,
(c) said lead dioxide mesh electrode comprising a substrate of titanium mesh having a coating of lead dioxide electrodeposited thereon, and being prepared by
(d) removing any surface grease from the titanium mesh substrate by treatment thereof with a degreasing solvent,
(e) electrochemically removing the titanium oxide film from the titanium mesh substrate by cathodization, carried out in an electrolyte of sulphuric acid, and thereafter,
(f) electrodepositing lead oxide onto the titanium substrate, which is made the anode, from electrolyte solution containing one or more lead salts, such that the anode current density is increased during the electrodeposition.

2. A process according to claim 1 wherein the oxidizable organic compound is selected from the group consisting of benzene, naphthalene and toluene.

3. A process according to claim 2 wherein the electrolyte is dilute sulphuric acid.

4. A process according to claim 3 wherein acetone is added to the electrolyte as a mutual solvent for the oxidizable organic compound and for the electrolyte.

5. A process according to claim 1 wherein stage (f) is carried into successive periods, the anode current density in the second period being higher than the anode current density employed during the first period.

6. A process according to claim 1 wherein electrolyte solution or suspension which has already passed through the lead dioxide mesh electrode is continuously or intermittently withdrawn from the electrolyte cell to an external reservoir.

7. A process according to claim 6 wherein electrolyte/oxidizable organic compound solution or suspension is recirculated from the external reservoir to the electrolytic cell to be re-contacted with the anode.

8. A process according to claim 1 wherein the cathode employed in the electrolytic cell is selected from the group consisting of a solid lead cathode and a titanium mesh, not coated with lead dioxide.

References Cited
UNITED STATES PATENTS

| | | | |
|---|---|---|---|
| 3,463,707 | 8/1969 | Gibson et al. | 204—290 F |
| 3,427,235 | 2/1969 | Leduc | 204—78 |
| 3,616,324 | 10/1971 | Covitz | 204—78 |
| 3,509,031 | 4/1970 | Covitz | 204—78 |
| 3,427,235 | 7/1969 | Leduc | 204—78 |
| 3,288,692 | 11/1966 | Leduc | 204—80 |
| 2,711,497 | 6/1955 | Ruben | 204—57 |
| 2,130,151 | 9/1938 | Palfreeman | 204—78 |
| 1,706,951 | 3/1929 | Benner | 204—57 |

FOREIGN PATENTS

| | | | |
|---|---|---|---|
| 1,189,183 | 4/1970 | Great Britain | 204—57 |
| 1,953,951 | 5/1971 | Germany | 204—78 |

RICHARD L. ANDREWS, Primary Examiner

U.S. Cl. X.R.

204—96, 141.5